US011315130B2

(12) United States Patent
Tanazawa et al.

(10) Patent No.: US 11,315,130 B2
(45) Date of Patent: Apr. 26, 2022

(54) VENDING MACHINE

(71) Applicant: THE COCA-COLA COMPANY, Atlanta, GA (US)

(72) Inventors: Takashi Tanazawa, Yokkaichi (JP); Minoru Murayama, Mie (JP); Kazuo Tsunoda, Yokkaichi (JP); Yusuke Nakajima, Yokkaichi (JP); Yasuo Nakazato, Koshigaya (JP); Yasuhiro Yamazaki, Kumagaya (JP); Takashi Nishiyama, Tokyo (JP)

(73) Assignee: THE COCA-COLA COMPANY, Atlanta, GA (US)

( * ) Notice: Subject to any disclaimer, the term of this patent is extended or adjusted under 35 U.S.C. 154(b) by 0 days.

(21) Appl. No.: 16/912,388

(22) Filed: Jun. 25, 2020

(65) Prior Publication Data
US 2020/0327562 A1 Oct. 15, 2020

Related U.S. Application Data

(63) Continuation of application No. PCT/JP2018/044766, filed on Dec. 5, 2018.

(30) Foreign Application Priority Data

Dec. 27, 2017 (JP) .............................. JP2017-251728

(51) Int. Cl.
*G07F 9/00* (2006.01)
*G06Q 30/02* (2012.01)
(Continued)

(52) U.S. Cl.
CPC ....... *G06Q 30/0201* (2013.01); *G06Q 10/087* (2013.01); *G06Q 20/18* (2013.01);
(Continued)

(58) Field of Classification Search
CPC ................ G06Q 20/18; G06Q 10/087; G06Q 30/0201; G07F 11/004
(Continued)

(56) References Cited

U.S. PATENT DOCUMENTS

| 5,027,283 A | * | 6/1991 | Phillips | ..................... G07F 5/18 |
| | | | | 700/236 |
| 5,272,321 A | * | 12/1993 | Otsuka | ..................... G07F 9/02 |
| | | | | 235/381 |
| 5,848,726 A | * | 12/1998 | Yajima | ................... G07F 11/08 |
| | | | | 221/150 HC |

(Continued)

FOREIGN PATENT DOCUMENTS

| JP | H10-198853 A | 7/1998 |
| JP | 2001-167328 A | 6/2001 |

(Continued)

OTHER PUBLICATIONS

International Search Report (PCT/ISA/210) of PCT/JP2018/044766, dated Mar. 12, 2019.

*Primary Examiner* — Timothy R Waggoner
(74) *Attorney, Agent, or Firm* — Rabin & Berdo, P.C.

(57) ABSTRACT

A vending machine includes a storage to store product management data in which an on-sale product management numbers is associated with product management content; an input and output unit to input and output the product management data; and an update control unit configured to update the product management data. Further, the update control unit collectively receives all the product management data including a part to be updated, stores all the product management data as update target product management data, displays the update target product management data including confirmation target information and stores the update target product management data as updated product management data.

5 Claims, 11 Drawing Sheets

(51) Int. Cl.
*G06Q 10/08* (2012.01)
*G06Q 20/18* (2012.01)
*G07F 11/62* (2006.01)
*G07F 7/00* (2006.01)
*G07F 9/02* (2006.01)

(52) U.S. Cl.
CPC .............. *G07F 7/00* (2013.01); *G07F 9/001* (2020.05); *G07F 9/002* (2020.05); *G07F 9/006* (2013.01); *G07F 9/026* (2013.01); *G07F 9/0235* (2020.05); *G07F 11/62* (2013.01)

(58) Field of Classification Search
USPC .................................................. 700/231–244
See application file for complete search history.

(56) References Cited

U.S. PATENT DOCUMENTS

| | | | |
|---|---|---|---|
| 2005/0161511 A1* | 7/2005 | Parker | G06K 7/10821 235/472.01 |
| 2007/0235465 A1* | 10/2007 | Walker | G07F 9/026 221/9 |
| 2013/0144432 A1* | 6/2013 | Canter | G07F 9/026 700/236 |

FOREIGN PATENT DOCUMENTS

| | | |
|---|---|---|
| JP | 2002-099954 A | 4/2002 |
| JP | 2004-246608 A | 9/2004 |
| JP | 2013-088936 A | 5/2013 |

\* cited by examiner

| SKU NUMBER | | PRODUCT COLUMN | PRODUCT SELECTION BUTTON | PRICE |
|---|---|---|---|---|
| PRODUCT CODE | H/C | | | |
| 000001 | C | 1,2,3 | 37 | 130 |
| 000002 | C | 4,5 | 38 | 130 |
| 000003 | C | 6,7 | 39 | 130 |
| 000004 | C | 8 | 40 | 130 |
| 000005 | C | 9 | 41 | 130 |
| 000006 | C | 10 | 42 | 130 |
| 000007 | C | 11,12,13 | 25 | 130 |
| 000008 | C | 14,15 | 26 | 130 |
| 000009 | C | 16,17 | 27 | 130 |
| 000010 | C | 18 | 28 | 130 |
| 000011 | C | 19 | 29 | 130 |
| 000012 | C | 20 | 30 | 130 |
| 000013 | C | 21 | 31 | 130 |
| 000014 | C | 22 | 32 | 130 |
| 000015 | C | 23 | 33 | 130 |
| 000016 | C | 24,25,26 | 34 | 130 |
| 000017 | C | 27,28 | 35 | 130 |
| 000018 | C | 29,30 | 36 | 130 |
| 000019 | C | 31 | 13 | 130 |
| 000020 | C | 32 | 14 | 130 |
| 000021 | C | 33 | 15 | 130 |
| 000022 | C | 34 | 16 | 130 |
| 000023 | C | 35 | 17 | 130 |
| | | | | |

FIG.10

| SKU NUMBER | | PRODUCT COLUMN | PRODUCT SELECTION BUTTON | PRICE |
|---|---|---|---|---|
| PRODUCT CODE | H/C | | | |
| 000001 | C | 1,2,3 | 37 | 130 |
| 000002 | C | 4,5 | 38 | 130 |
| 000003 | C | 6,7 | 39 | 130 |
| 000004 | C | 8 | 40 | 130 |
| 000005 | C | 9 | 41 | 130 |
| 000006 | C | 10 | 42 | 130 |
| 000007 | C | 11,12,13 | 25 | 130 |
| 000008 | C | 14,15 | 26 | 130 |
| 000009 | C | 16,17 | 27 | 130 |
| 000013 | C | 21 | 28 | 130 |
| 000011 | C | 19 | 29 | 130 |
| 000012 | C | 20 | 30 | 130 |
| 000013 | C | 21 | 31 | 130 |
| 000014 | C | 22 | 32 | 130 |
| 000015 | C | 23 | 33 | 130 |
| 000016 | C | 24,25,26 | 34 | 130 |
| 000017 | C | 27,28 | 35 | 130 |
| 000018 | C | 29,30 | 36 | 130 |
| 000022 | C | 34 | 13 | 130 |
| 000020 | C | 32 | 14 | 130 |
| 000021 | C | 33 | 15 | 130 |
| 000022 | C | 34 | 16 | 130 |
| 000023 | C | 35 | 17 | 130 |

B11 CONFIRMATION
B12 CANCEL
B13 SEPARATION AND CONNECTION

FIG.11

VENDING MACHINE

BACKGROUND

The present disclosure relates to a vending machine.

In many types of traditional vending machine, the stock of the products is managed by product column accommodating the same kind of products. For example, Japanese Laid-open Patent Publication No. 2001-167328 describes a vending machine that stores column-selection button setting data, which is input using a remote controller and other devices, and changes the settings of the column-selection button setting data on the occasions of replacing products, for example, on seasonal changes and release of new products. More specifically, in Patent Literature 1, a certain number is assigned to the column-selection button setting data, and the setting data is stored together with the date of storage of the data. In updating the column-selection button setting data, the stored date and the column-selection button setting data are loaded together and displayed by inputting the assigned number.

SUMMARY

There is a need for a vending machine restocking of which is easy and time saving.

According to an embodiment, a vending machine that sells products accommodated in a plurality of product columns, includes: a storage storing product management data in which an on-sale product management numbers is associated with product management content, the on-sale product management number indicating a minimum management unit including a product code, allocated to each product prior to sales of the product, and a cold/hot condition upon product sales, the product management content including a product column number; an input and output unit inputting and outputting the product management data; a selling control unit controlling selling the product based on the product management data; and an update control unit updating the product management data. Further, the update control unit collectively receives all the product management data including a part to be updated, stores all the product management data as update target product management data, displays, on the input and output unit, the update target product management data including confirmation target information, which indicates a difference between the product management data and the update target product management data, when the product is refilled and stores the update target product management data as updated product management data when a confirmation process is performed on the confirmation target information.

BRIEF DESCRIPTION OF DRAWINGS

FIG. 6 is a table of example update product management data sorted by SKU number;

FIG. 10 is a table of example update product management data displayed on an operation display; and FIG. 11 is a drawing that illustrates example column separation and connection setting windows.

DETAILED DESCRIPTION

In the related art, for replacing products, for example, on seasonal changes and release of new products, an operator needs to load products into the vending machine while paying attention to the locations of the product columns. More specifically, the operator first designates a product column number to check the stock, looks for products to be stored in the column, and loads the products into the column. Replacing operation is therefore time-consuming.

Embodiments of the present disclosure will now be described with reference to the accompanying drawings.

First Embodiment

Overall Configuration

Figure 1:
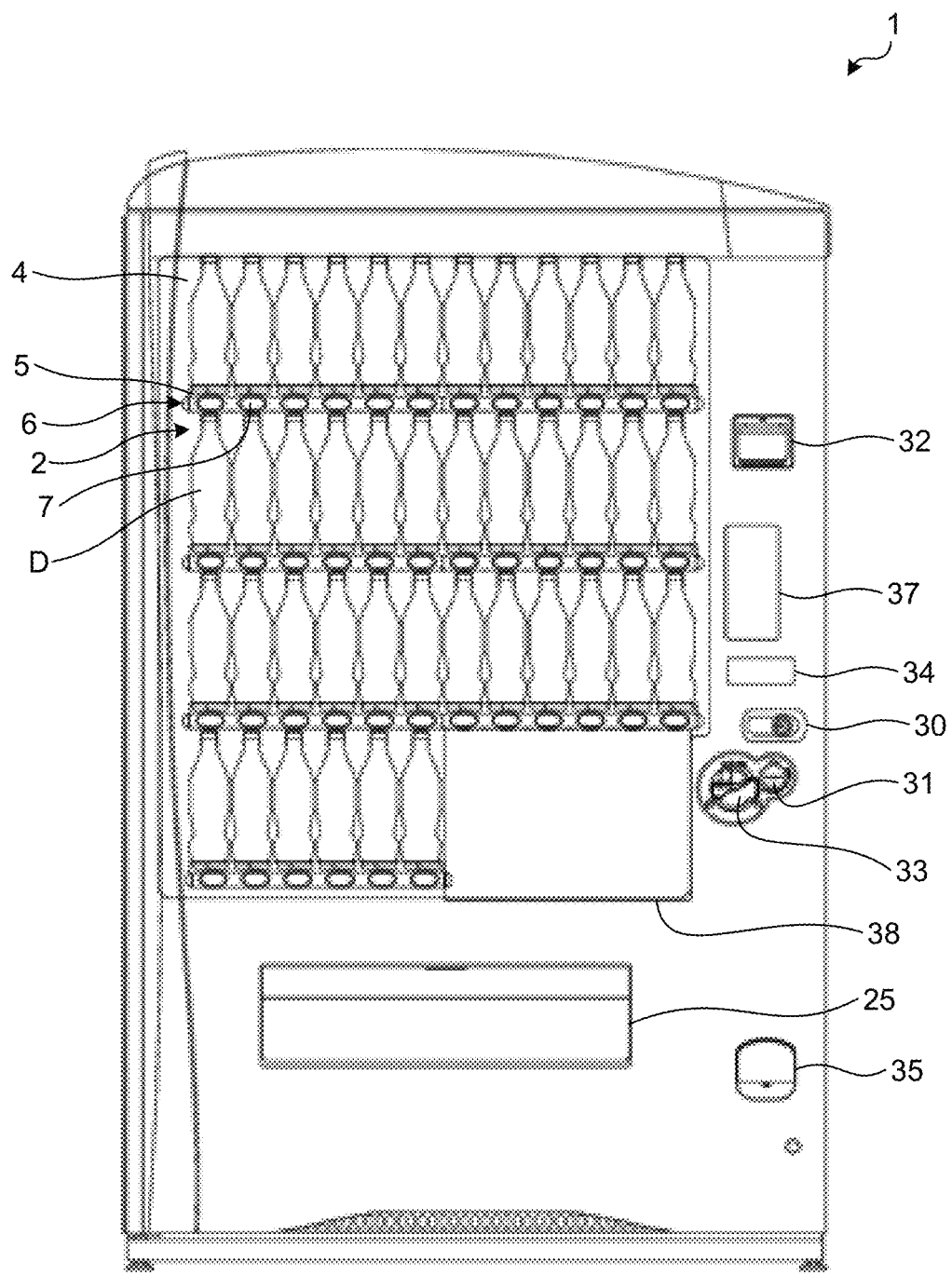
FIG. 1 is a front view of a vending machine according to a first embodiment of the present disclosure.
Figure 2:
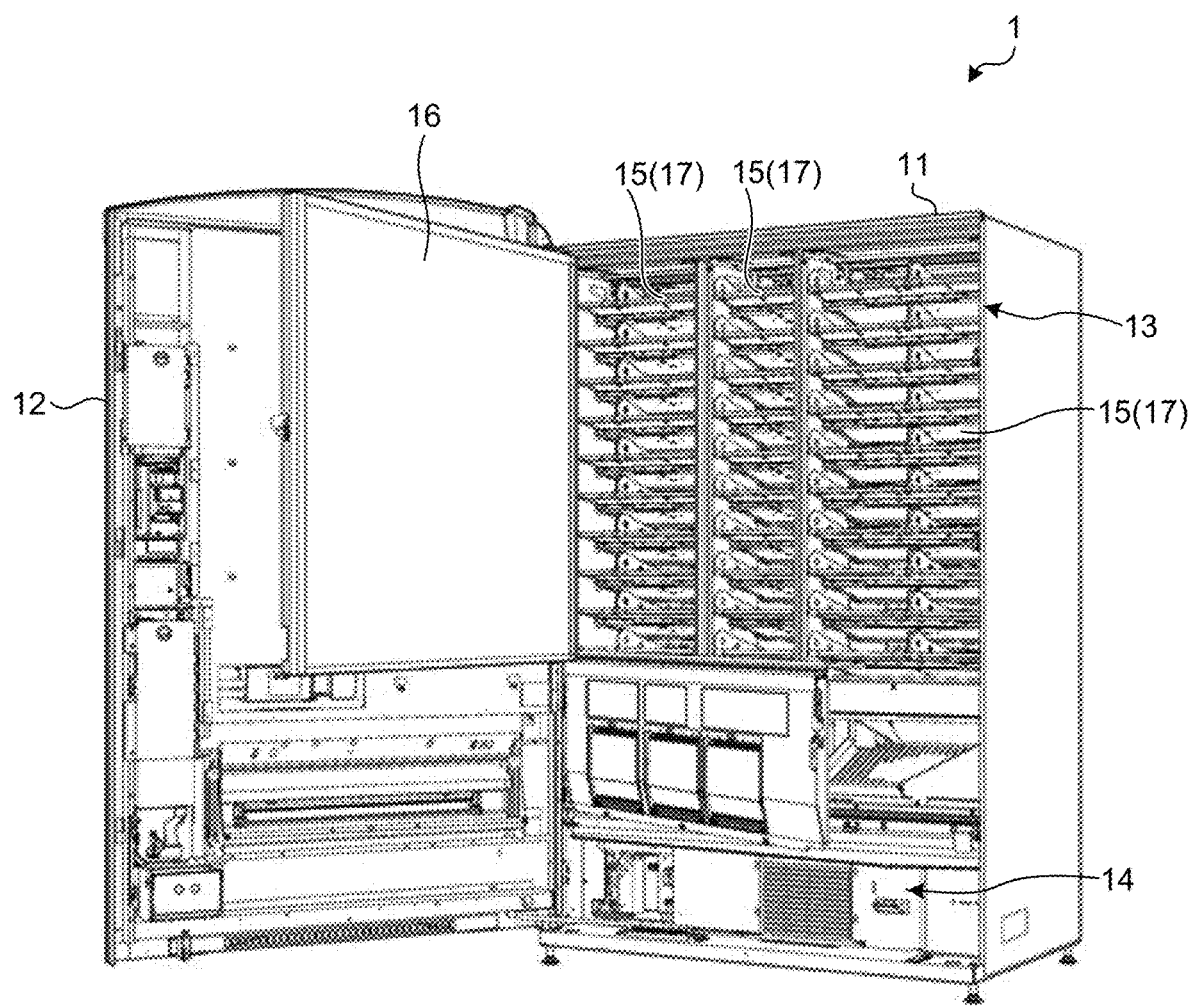
FIG. 2 is a perspective view of the vending machine of FIG. 1 with an outer door of the machine open.
Figure 3:
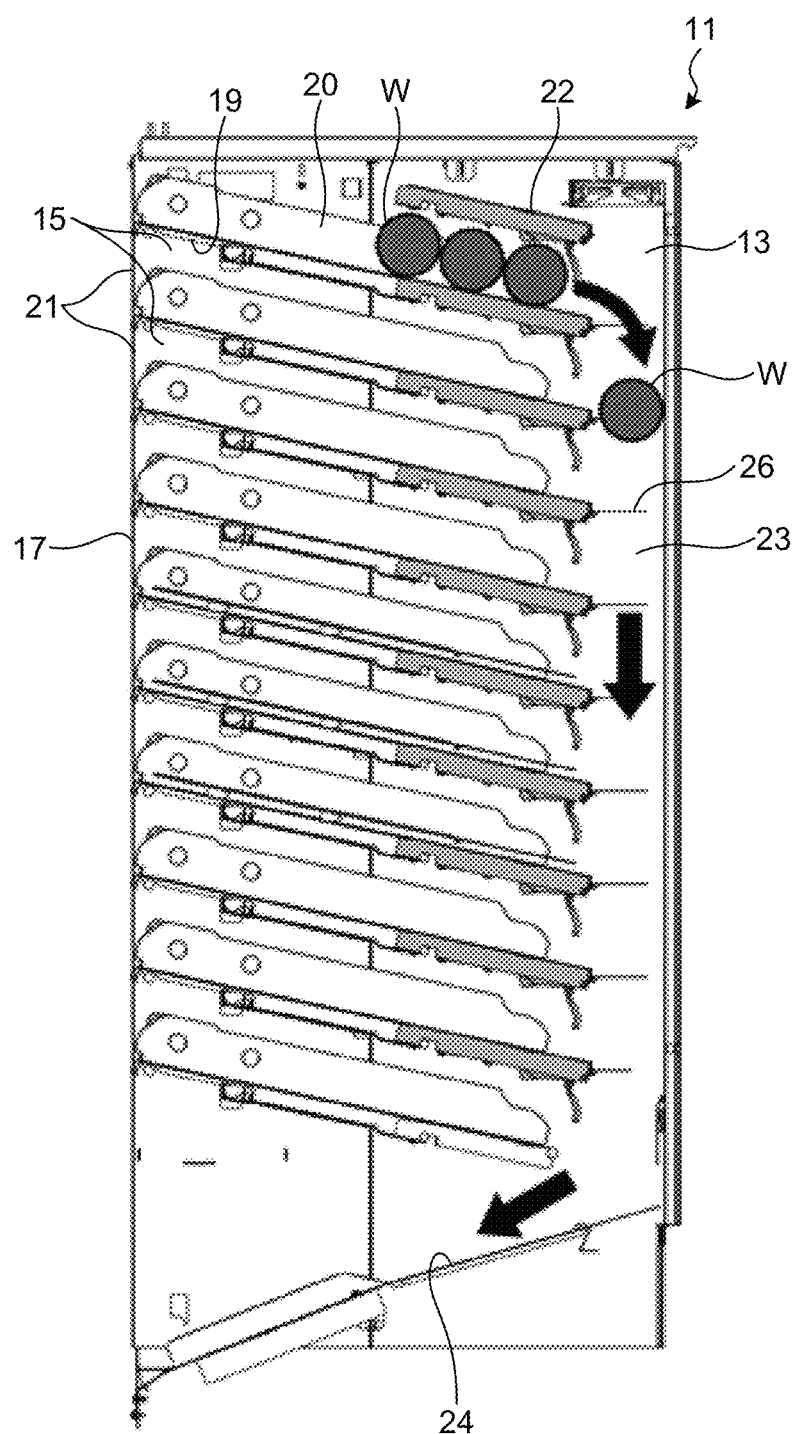
FIG. 3 is a sectional view of a cabinet body of the vending machine of FIG. 1 when viewed from the side thereof.
Figure 4:
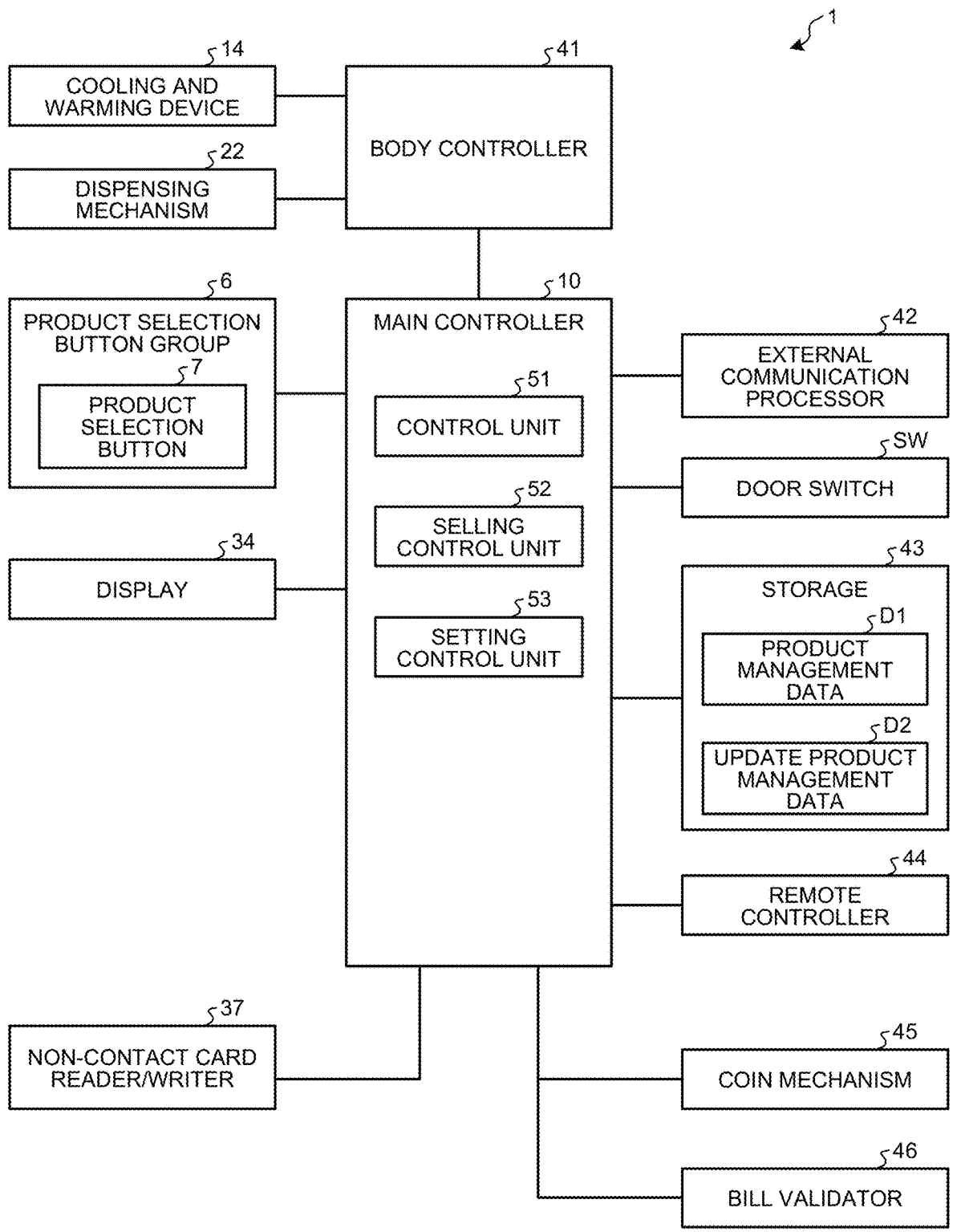
FIG. 4 is a block diagram that illustrates a control system of the vending machine of FIG. 1.

FIG. 1 is a front view of a vending machine 1 according to a first embodiment of the present disclosure. FIG. 2 is a perspective view of the vending machine 1 of FIG. 1 with an outer door 12 open. FIG. 3 is a sectional view of a cabinet body 11 of the vending machine 1 of FIG. 1 when viewed from the side thereof. FIG. 4 is a block diagram that illustrates a control system of the vending machine 1 of FIG. 1. The vending machine 1 sells products such as canned beverages, glass bottled beverages, and plastic bottled beverages.

As illustrated in FIG. 1, a product selection button 7 is provided below each product sample D, on the front of the vending machine 1. A showcase 2 accommodates therein four stages 5 arranged one over the other to display products. The product samples D are arranged side by side on each stage 5. A transparent illumination board 4 is attached to the front of the showcase 2. The illumination board 4 has four product selection button groups 6 that are arranged in the vertical direction in a manner corresponding to respective stages 5. The showcase 2 including the above product samples D and the product selection buttons 7 may be configured as a combination of touch screens, such as digital signage.

A coin slot 31, a bill slot 32, a return lever 33, a pop-up handle 30, a display 34, and a non-contact card reader/writer 37 are disposed on the front, at the right of the showcase 2. A coin return port 35, a product take-out port 25, and an advertisement area 38, are provided on the front, below the showcase 2. The advertisement area 38 may be replaced by an input and output unit such as a touch screen.

As illustrated in FIG. 2, the vending machine 1 includes a cabinet body 11. The cabinet body 11 is in the shape of box having an open front. The front opening is closed by an openable outer door 12. The inside of the cabinet body 11 is separated into a product storage room 13 and a cooling and warming device 14. The product storage room 13 includes a product storage rack 17 (hereinafter may be referred to as a "slant rack") having a plurality of product columns 15 for accommodating products. Each product column 15 accommodates a plurality of products of the same kind. The product columns 15 are separated from one another by insulating partitions, depending on the cold/hot condition (cold/hot status) of the product. With the outer door 12 closed, an insulating door 16 covers the front, of the product storage room 13, closer to the outer door.

As illustrated in FIG. 3, the product column 15 of the product storage rack 17 is a slant column that constructs a storage passage 20 together with a shelf board 19 sloping down to the back. The product column 15 includes such a product column that is separatable and/or connectable with another product column 15. The product columns 15 designed as slanted and separatable and/or connectable columns are capable of accommodating a number of, various kinds of products. More specifically, products W are slotted into the storage passage 20 through a product slot 21 provided at the front end of the product column 15 and aligned on the passage. The product column 15 is provided with a dispensing mechanism 22 at the rear end thereof. The dispensing mechanism 22 dispenses the product W on the storage passage 20 one by one to a drop passage 23 disposed at the furthest back of the product storage room 13.

The product W dispensed to the drop passage 23 is guided to the product take-out port 25 of the outer door 12 through a chute 24 disposed at the lower end of the drop passage 23 and sloping down toward the front. The product column 15 is further provided with a brake plate 26 at the rear end thereof. The brake plate 26 slows down the product W falling through the drop passage 23.

As illustrated in FIG. 4, in the vending machine 1, a main controller 10 is connected with a product selection button group 6 consisting of product selection buttons 7, the display 34, the non-contact card reader/writer 37, an external communication processor 42, a door switch SW, a storage (memory) 43, a remote controller 44, a coin mechanism 45, a bill validator 46, and a body controller 41. The body controller 41 is connected with the cooling and warming device 14 and the dispensing mechanisms 22. The main controller 10 includes a control unit 51, a selling control unit 52, and a setting control unit (update control unit) 53.

The control unit 51 integrally controls the units connected to the main controller 10. The selling control unit 52 controls a flow of selling process from selection of a product using the product selection button 7 to dispensing of the product. The cooling and warming device 14 cools the product column 15 set to be cooled and warms the product column 15 set to be warmed, under control of the body controller 41. The dispensing mechanism 22 transports a product on which a transaction for purchase is completed to the product take-out port 25. The display 34 displays various information relating to product purchase, such as slotted money. The non-contact card reader/writer 37 reads information of a digital money card or writes information thereto. The coin mechanism 45 is a coin handling apparatus including, the coin slot 31, the return lever 33, the coin return port 35, and others. The bill validator 46 is a bill handling apparatus including the bill slot 32 and others. The external communication processor 42 establishes connection to an external network (not illustrated) and establishes near-field wireless communication such as WiFi (registered trademark).

The door switch SW detects that the outer door 12 has been opened and closed by operation of the pop-up handle 30. The storage 43 stores product management data D1, which is currently effective data, and update product management data (update target product management data) D2, in which setting changes are embedded. The remote controller 44 is connected in a wired manner to the main controller 10 and is used to confirm the product management data D1 and to change settings based on the update product management data D2. The product management data D1 and the update product management data D2 are input by the external communication processor 42. The product management data D1 and the update product management data D2 are input together via a network or near-field wireless communication.

The setting control unit 53 receives a full set of product management data including settings to be changed through one operation and stores the data in the storage 43 as the update product management data D2. The update product management data D2, which includes confirmation information that indicates a difference between the product management data D1 and the update product management data D2, is displayed on the remote controller 44 in reloading of products. After confirmation processing on the confirmation information, the update product management data D2 is stored as the current product management data D1. The product management data D1 is currently effective data based on which the vending machine 1 is operating, whereas the update product management data D2 is product management data that is preset and is on standby for setting change (update). After the above confirmation processing using the remote controller 44, the update product management data D2 replaces the product management data D1 that is currently effective.

Figure 5:
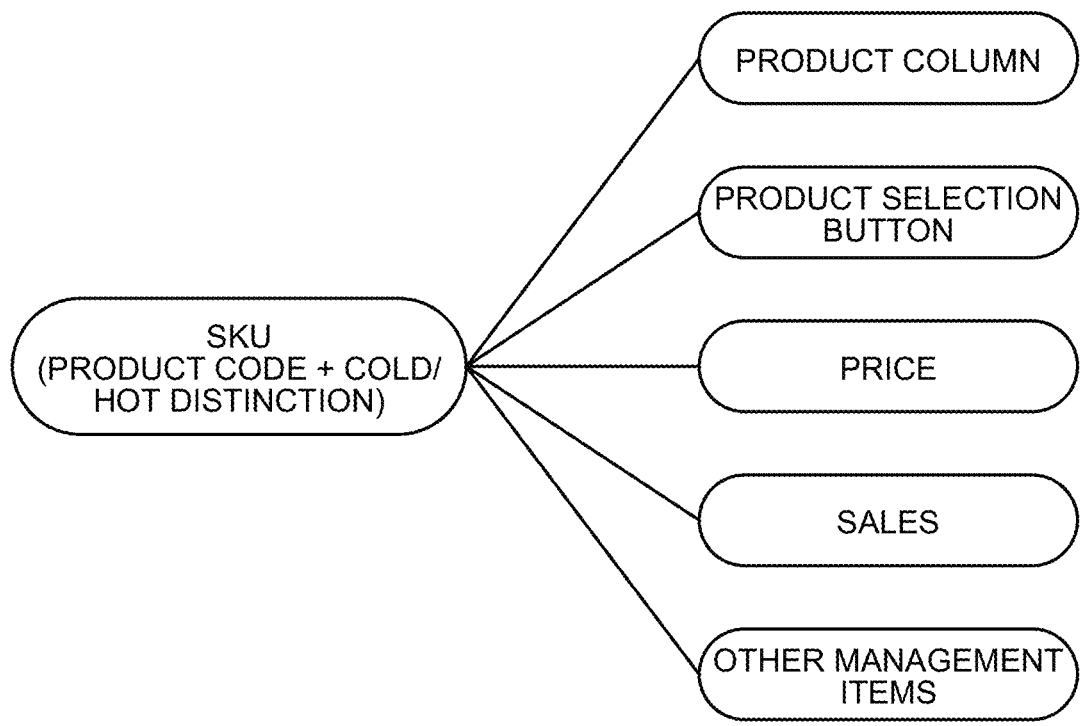
FIG. 5 is a drawing that illustrates a management structure centered around a minimum management unit as a combination of a product code and a cold/hot condition for the product.

As illustrated in FIG. 5, the product management data D1 and the update product management data D2 set by the setting control unit 53 are managed using an on-sale product management number representing the smallest management unit (minimum management unit) (stock keeping unit (SKU)). The SKU is a combination of a product code allocated for each product prior to sale and the cold/hot distinction (cold/hot condition) for the on-sale product. The on-sale product management number, or the SKU, is associated with management items, such as the product column 15, the product selection button 7, the price, and the sales (sales amount).

The product code allocated prior to sale is a common product code. The same kind of products may have different product codes, depending on the content and the type of container. For example, a canned coffee has a different product code from that of a plastic bottled coffee even if both are in 370 ml containers. A 185 ml canned coffee has a different product code from that of a 370 ml canned coffee. Such a product code allocated prior to sale is used in the distribution process prior to sale, and also used as a part of the smallest management unit (SKU). A conventional SKU number identical to a product code is thus a pre-sale SKU number. Products sharing the same pre-sale SKU number, however, may be sold at the vending machine under different cold/hot conditions. For example, 185-ml canned coffees of the same brand having the same pre-sale SKU number may be stored in separate product columns to be sold as a hot beverage and as a cold beverage separately. In this case, since the same 185-ml canned coffees have different expiration dates depending on their cold/hot conditions, the beverages must be managed as different kinds of product. In the first embodiment, an on-sale product management number (hereinafter, the "SKU number"), in which a product code before sale is combined with the cold/hot condition for the on-sale product, is used as the smallest product management unit. The cold/hot condition means that the temperatures of the products for sale are set to 55 degrees Celsius and 4 degrees Celsius, for example; however, the setting may include another temperature such as a room temperature of 20 degrees Celsius, for example.

As illustrated in FIG. 6, for example, the update product management data D2 is managed by the on-sale product management number, or the SKU number, associated with management items such as a product column, a product selection button, and the price. The SKU number is a number for the smallest product management unit, and is represented as, for example, "000001-C" if the product has a product code "000001" and is stored in a cold/hot condition "COLD". In this case, the condition "COLD" means that the temperature of the product for sale is set to 4 degrees Celsius. Conversely, the condition "HOT" means that the temperature of the product is set to 55 degrees Celsius, and is represented as "H". Products sharing the SKU number "000001-C" are the same kind of products, and stored in respective three product columns 15 numbered as "1", "2", and "3". The locations of product selection buttons 7 for selecting the products having the SKU number "000001-C" are numbered as "37". The prices of the products sharing the SKU number "000001-C" are "130" yen.

In restocking the vending machine, an operator inputs the SKU number to the remote controller 44 and easily finds product column numbers associated with the SKU number. The operator can easily recognize a plurality of product columns sharing the SKU number and is thus allowed to restock the columns on a per-product basis. This manner makes the restocking operation easier and time saving and further reduces errors of putting in wrong products.

Figure 7:
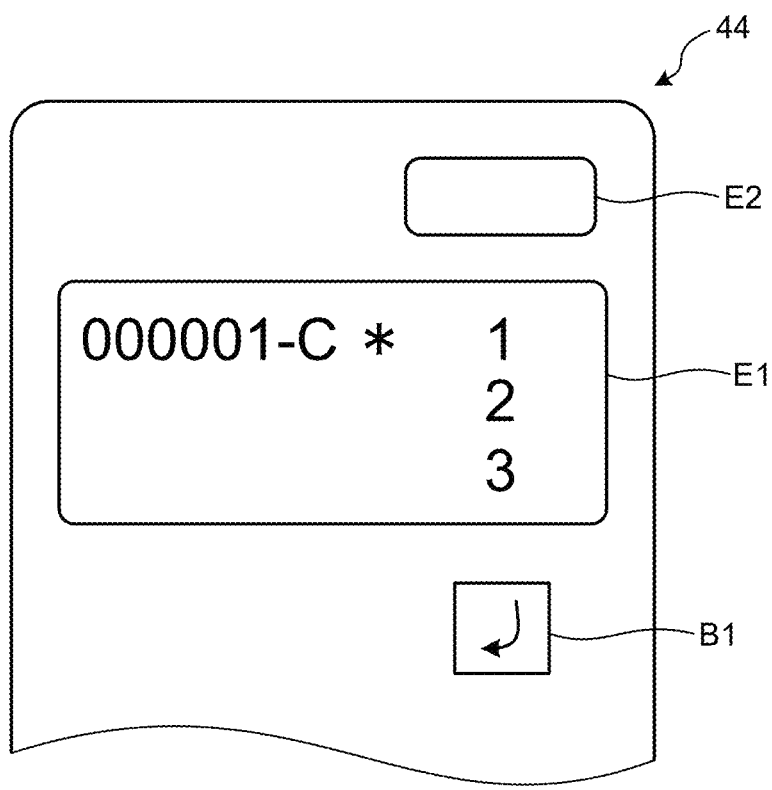
FIG. 7 is a drawing that illustrates a remote controller displaying the update product management data being confirmed.

FIG. 7 is a drawing that illustrates the remote controller 44 displaying the update product management data D2 to be confirmed. As illustrated in FIG. 7, the remote controller 44 displays the update product management data D2 in the order of SKU number, on a display field E1. In FIG. 7, the remote controller 44 displays a certain SKU number and product columns associated with the number. Products having the SKU number "000001-C" are stocked in the product columns "1", "2", and "3". The sign "*" represents confirmation information, and indicates that there is a difference between the product management data D1 and the update product management data D2. By pressing a confirmation button B1, confirmation processing on the confirmation information is performed. Upon completion of the confirmation processing, the next SKU number and an associated product column are displayed. When no signs "*" are displayed, the next SKU number and an associated product column are displayed by pressing the confirmation button B1. To check the SKU number and a product selection button associated with the number, the operator presses a direction key (a right arrow key) (not illustrated). Information of the product selection button, illustrated on the right of the table of FIG. 6, is then displayed together with the SKU number. In this case, the SKU number "000001-C" and the product selection button "37" are displayed. The price of a product and other items can be displayed in the same manner.

A display field E2 displays an error indication if confirmation processing is not completed on all the confirmation information pieces, indicating a difference to be confirmed between the product management data D1 and the update product management data D2. In other words, the error indication is being displayed as long as there is unconfirmed confirmation information, indicating a difference to be confirmed between the product management data D1 and the update product management data D2.

Procedure of Confirmation Processing on Update Product Management Data D2

Figure 8:
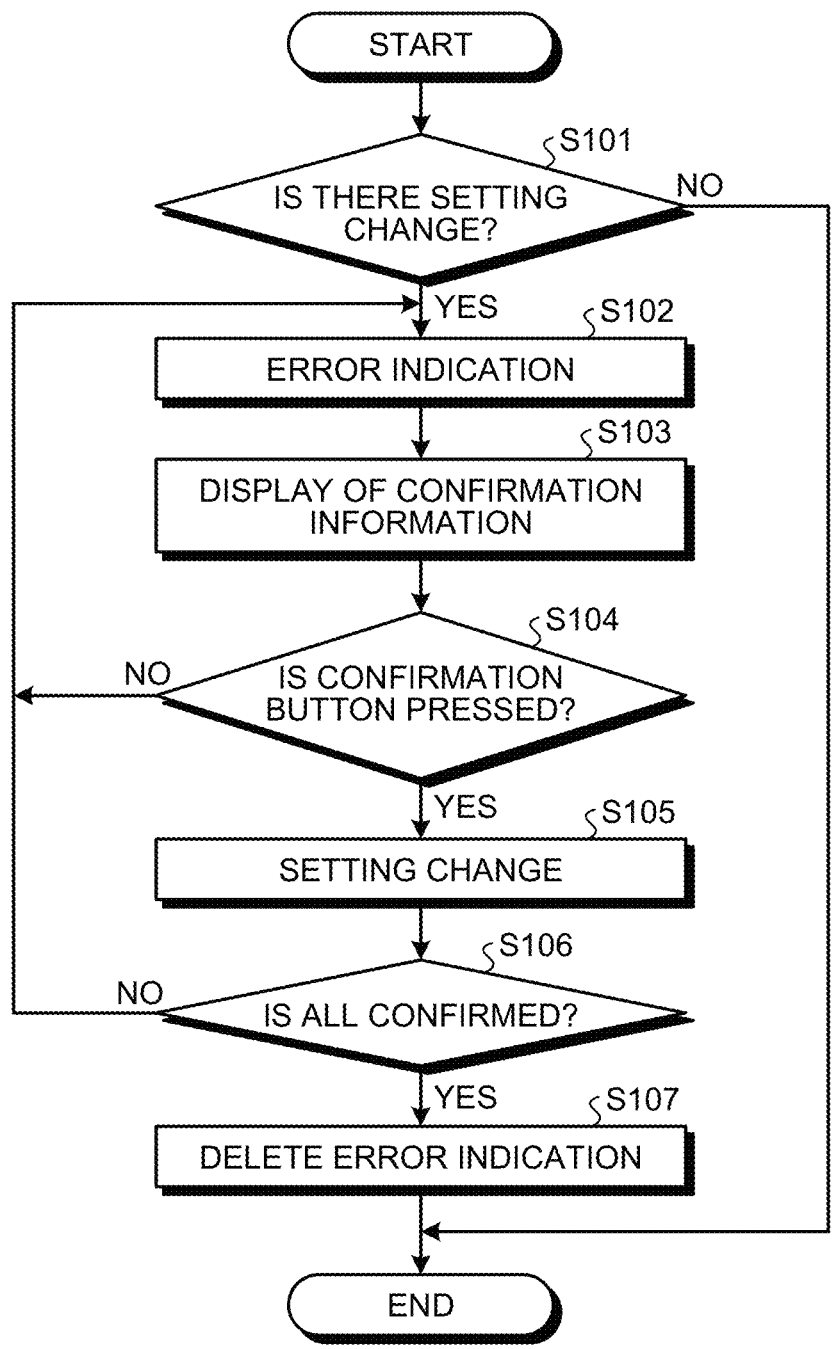
FIG. 8 is a flowchart that illustrates the procedure of confirmation processing performed on the update product management data by a setting control unit.

The setting control unit 53 performs the confirmation processing on the update product management data D2 in accordance with the flowchart of FIG. 8. The procedure assumes that the currently effective product management data D1 and the preset update product management data D2 are previously stored in the storage 43.

As illustrated in FIG. 8, the setting control unit 53 determines the presence or absence of a difference (a setting change) between the product management data D1 and the update product management data D2 (Step S101). In the absence of any setting change (No at Step S101), the processing ends. In the presence of a setting change (Yes at Step S101), the display field E2 displays an error indication (Step S102). The display field E2 then displays the sign "*", representing confirmation information indicating that there is a setting change (Step S103). The setting control unit 53 determines whether the confirmation button B1 has been pressed (Step S104).

If the confirmation button B1 is not pressed (No at Step S104), the process returns to Step S102, and the error indication remains displayed. If the confirmation button B1 has been pressed (Yes at Step S104), the displayed setting change is implemented (Step S105). The setting control unit 53 determines whether all the confirmation information pieces have been confirmed (Step S106). If not all the confirmation information pieces have been confirmed (No at Step S106), the process returns to Step S102, and the error indication remains displayed. If all the confirmation information pieces have been confirmed (Yes at Step S106), the error indication is deleted (Step S107), and the processing flow ends.

In the first embodiment, an operator checks the update product management data D2 displayed on the remote controller 44 and provides the confirmation processing on the confirmation information pieces to make setting changes as indicated. Setting changes embedded in the update product management data D2 thus can be implemented by such simple operation. In the first embodiment, the product management data D1 and the update product management data D2 are managed by the SKU number. An operator who restocks (refills) the product columns on certain occasions, such as replacing of products, is allowed to start the restocking operation from a product within reaching distance of the operator. This manner can reduce the time for restocking. With the time for setting changes and restocking shortened, the total time elapsing to complete the restocking operation can be significantly reduced.

In the first embodiment, the product management data D1 and the update product management data D2 are set in the storage 43 of the vending machine 1 by, for example, a manager of the vending machine 1. This manner facilitates management of the manager. The manager may set the update product management data D2 to be processed at a certain time via, for example, a network or near-field wireless communication.

The update product management data D2 is set by the manager, while confirmation processing of the update product management data D2 is performed by the operator. Such separation of roles can considerably reduce the time for the operator to replace products, and accordingly considerably reduce the time in which the vending machine 1 is kept away from selling. In many cases, the vending machine 1 is installed outdoors in harsh environments. The above structure is beneficial in significantly reducing the time to restock the vending machine 1 and thus in reducing the work load of the operator.

The first embodiment uses the remote controller 44 for confirmation and setting changes of the update product management data D2; however, without being limited thereto, a handheld terminal capable of near-field wireless connection may be used for confirmation and setting changes of the update product management data D2. The manager may also use the handheld terminal to store, for update, the update product management data D2, which is previously stored in the handheld terminal, in the storage 43 from the outside of the vending machine 1 without opening the outer door 12.

Second Embodiment

In the first embodiment, an operator uses the remote controller 44 and a handheld terminal to confirm the update product management data D2 by the SKU number and to make setting changes. In a second embodiment, the data is displayed on an operation display 60 provided on the front of the vending machine 1, so that the operator can provide confirmation processing and setting changes through the operation display 60.

Figure 9:
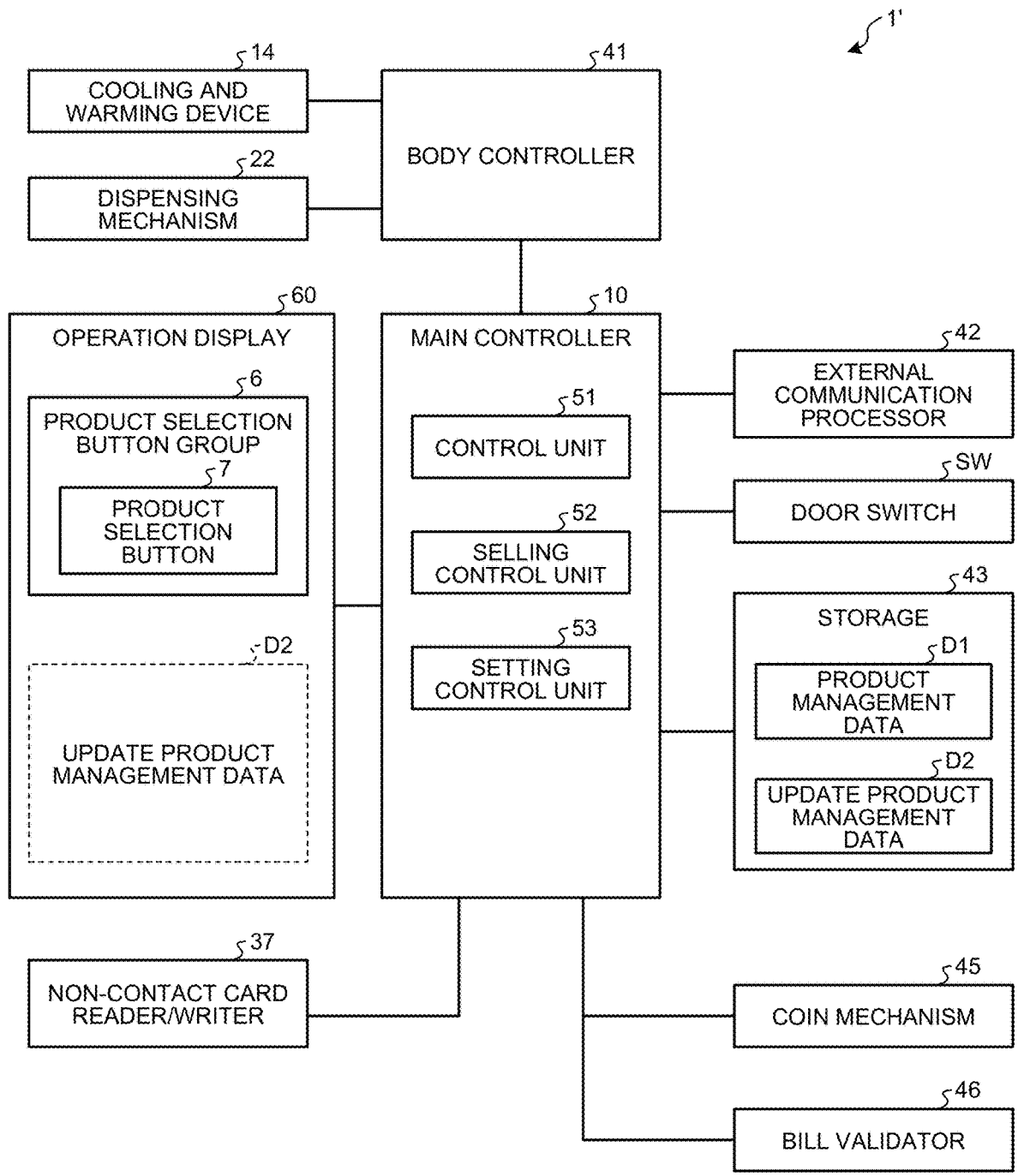
FIG. 9 is a block diagram that illustrates a control system of a vending machine according to a second embodiment.

FIG. 9 is a block diagram that illustrates a control system of a vending machine 1' of the second embodiment. Unlike the vending machine 1, the vending machine 1' has no displays 34 nor remote controllers 44. Instead of these, the vending machine 1' includes the operation display 60 that displays at least the update product management data D2 and further displays the product selection button group 6 and image data of product samples and that is capable of receiving operation to the product selection button group 6 and to the update product management data D2. The operation display 60 may use, for example, a touch screen. Except this, the configuration is the same as that of the first embodiment.

The operation display 60 switches the screen between a sale product selection window that displays the product selection button group 6 and image data of product samples and a management window that displays the update product management data D2. The setting control unit 53 displays the management window on the operation display 60 when the door switch SW is turned to the open position and displays the sale product selection window on the operation display 60 when the door switch SW is turned to the closed position. The setting control unit 53 can usually keep the sale product selection window displayed on the operation display 60. When a specific operation is input to the operation display 60, the setting control unit 53 can switch the screen to the management window, and may return the screen to the sale product selection window upon input indicating completion of the confirmation processing. The specific operation is a certain kind of operation known to only the operator and the manager. For example, the specific operation includes simultaneously inputting predetermined keys to a displayed numeric key pad. The specific operation may include inputting a password.

As illustrated in FIG. 10, the update product management data D2 is completely viewable on the operation display 60. Data pieces, of the update product management data D2, to be changed are emphasized by decoration, such as changing text colors and background colors and making cells blink. The operator is thus allowed to easily check the data pieces to be changed.

A confirmation button B11, a cancel button B12, a separation and connection button B13 are displayed below the operation display 60. On the operation display 60, confirmation and setting changes (update) of the update product management data D2 are executed at once by pressing the confirmation button B11. When the operator presses the confirmation button B11, decorations for emphasis are removed. With this operation, the update product management data D2 replaces the product management data D1 and becomes effective. The cancel button B12 and the separation and connection button B13 are used by the manager who creates the update product management data D2. Pressing the separation and connection button B13 causes a later-described column separation and connection setting window E13 to be displayed. Arrangement of the product columns based on the update product management data D2 is viewable on the column separation and connection setting window E13.

Figure 11:
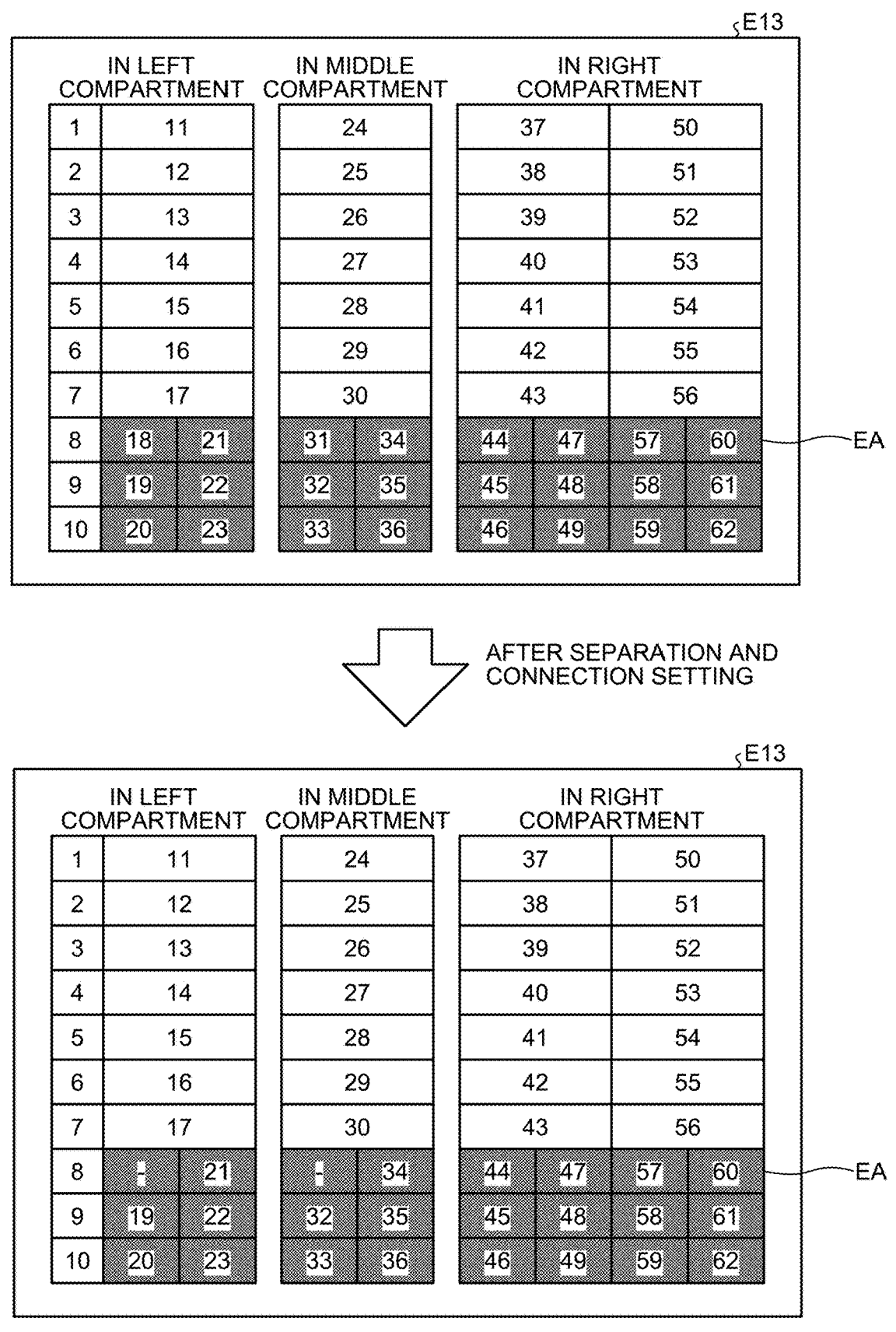

When the manager presses the separation and connection button B13, the column separation and connection setting window E13, the upper drawing of FIG. 11, is displayed. The column separation and connection setting window E13 displays arrangement of the product columns 15 when viewed from the front thereof. Of the window, a display field EA containing separatable and connectable product columns is emphasized by decoration, such as changing text colors and background colors and making the cells blink. The manager operates the emphasized display field EA for separating and connecting the product columns 15 with each other. The display field EA displays such cells of product columns that are separatable and connectable with adjacent cells. For example, the cells of the display field EA are repeatedly separated and connected with each other whenever the manager clicks the cells. For example, when a product column "18" is clicked, display of the column is changed to "-", and the product column "18" is connected with a product column "21". When certain product columns are connected with each other, display of either product column having a smaller column number is changed to "-". When these product columns are connected, a larger product column number is then displayed on the setting screen of the update product management data D2, as illustrated in FIG. 10. For example, in FIG. 10, two SKU numbers "000013-C" have the same product column number "21". Likewise, when a product column "31" is clicked, display of the column is changed to "-", and the product column "31" is connected with a product column "34". As illustrated in FIG. 10, two SKU numbers "000022-C" are associated with the same product column number "34" on the setting screen of the update product management data D2.

For example, when the manager clicks a cell on the setting screen of the update product management data D2 of FIG. 10 with the intention to change the setting of the cell, a numeric keypad may pop up to allow him/her to input a desired numerical value. The update product management data D2, setting changes based on which have been done, is stored in a terminal or other device of the manager when the confirmation button B11 is pressed. The stored update product management data D2 is created for each vending machine 1' and stored, for update, in the storage 43 of the vending machine 1' as its update product management data D2.

The update product management data D2 created by the manager in the second embodiment is the same as the update product management data D2 of the first embodiment, in which the update product management data D2 is stored, for update, in the storage 43 of the vending machine 1 as its update product management data D2.

In the second embodiment, the operation display 60 has a large screen. The update product management data D2 is therefore allowed to be completely displayed on the screen, which facilitates the confirmation processing and the setting changes by the operator.

In the second embodiment, the operation display 60 is used to display the sale product selection window and the management window for displaying the update product management data D2. Use of the operation display 60 can omit additional components, such as the remote controller 44 and the display 34, from the structure and thus make the configuration of the vending machine 1' more simple. Bar code payment, available by causing a two-dimensional bar code or the like to be displayed on the operation display 60, is advantageous in making the vending machine 1' more simple, without the necessity of using the coin mechanism 45, the bill validator 46, the non-contact card reader/writer 37 or the like.

In the second embodiment, the operation display 60 is not used to create the update product management data D2; however, the manager can directly create the update product management data D2 using the operation display 60.

The operation display 60 of the second embodiment may replace the advertisement area 38 of FIG. 1. In this case, the operation display 60 is not used as the sale product selection window. The setting control unit 53 causes the operation display 60 to display the management window when the door switch SW is turned to the open position and keeps an advertisement or others displayed while the door switch SW is at the closed position.

As described above, the slant rack 17 of the first embodiment and the second embodiment accommodates therein a number of product columns 15 arranged in the vertical and horizontal directions. The structure of the slant rack 17 is therefore capable of selling a wider range of products in response to requests of having a larger selection of products.

Compared to a serpentine rack, which has serpentine product storage passages extended in the vertical direction between passage segments and dispenses products stacked in the storage passage one by one through a dispensing mechanism at the bottom of the passage, the slant rack 17 uses a plurality of shelf boards arranged in the vertical direction for storing products. This structure of the rack is allowed to have a large number of columns and is therefore capable of selling a wide range of products, compared to the serpentine structure. A slant rack-type vending machine is provided with a larger number of product columns than a serpentine-type vending machine of the same size, and is therefore suited for selling a variety of products.

On each shelf board of the slant rack 17, products are laid on their sides and aligned one behind the other. With regards to a serpentine rack accommodating products in serpentine passages extended in the vertical direction, putting products into the passage tends to be noisy because the products are dropped from the opening of the passage. From this aspect, the structure of the slant rack 17 is advantageous in making loading of products quieter.

The shelf board, as the product storage passage, of the slant rack 17 slopes down to the back. The product is therefore kept in a stable position on the board, compared to the serpentine structure that accommodates products in a vertically extended serpentine passage. The shelf board is provided with a dispensing mechanism for dispensing the accommodated product one by one, at the rear end thereof (in front of the drop passage). Since the products are aligned in front of the dispensing mechanism, the operator can view the accommodated products from the front of the vending machine and directly reach the products.

The first and the second embodiments describe a method of product management using the SKU number. Without being limited to this, the method is applicable to a vending machine having no consideration for a cold/hot condition of the products and to a machine managing the products by the product column.

Configurations illustrated in the embodiments and modifications are functionally schematic and have no necessity of physically being configured as illustrated. The specific modes of separation and integration of the devices and components are not limited to the illustrated modes, and the whole of or a part of the device and all of or some of the components are allowed to be configured in a functionally or physically dispersed or integrated manner in any unit, based on the conditions of use and others.

According to the present disclosure, update product management data is previously stored, and only by confirmation thereof, the update product management data becomes effective as operational product management data. This method can make reloading of products easy and time saving.

In the vending machine according to the present disclosure, the setting control unit causes the update product management data including the confirmation information to be displayed on the touch screen when a front outer door is opened and switches the display to the sale product selection window when the outer door is closed.

In the vending machine according to the present disclosure, the setting control unit causes the update product management data including the confirmation information to be displayed on the touch screen upon a specific operation, and switches the display to the sale product selection window upon operation indicating completion of the confirmation processing.

In the vending machine according to the present disclosure, the setting control unit changes the settings based on the update product management data all at once when completion of the confirmation processing is input to the touch screen.

In the vending machine according to the present disclosure, the update product management data is received via a network.

In the vending machine according to the present disclosure, the product column is a slant column and includes such a product column that is separatable and connectable with another product column.

Although the present disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A vending machine that sells products accommodated in a plurality of product columns, the vending machine comprising:

a storage configured to store product management data in which an on-sale product management numbers is associated with product management content, the on-sale product management number indicating a minimum management unit including a product code, allocated to each product prior to sales of the product, and a cold/hot condition upon product sales, the product management content including a product column number, and update target product management data in which a part to be updated in the product management data is included;

an input and output unit configured to allow an operator to input and output the product management data;

a selling control unit configured to control selling the product based on the product management data; and an update control unit configured to update the product management data, wherein the update control unit is configured to, after the update target product management data is received and when the product is refilled, cause the input and output unit to display confirmation target information in the update target product management data, the confirmation target information indicating a difference between the product management data and the update target product management data when the product is refilled, and store the update target product management data as updated product management data when an input process is performed by the operator on the confirmation target information by using the input and output unit.

2. The vending machine according to claim 1, wherein the input and output unit is a remote controller disposed inside a vending machine and is connected in a wired manner.

3. The vending machine according to claim 1, wherein the input and output unit is a handheld terminal and is capable of being operated outside the vending machine.

4. The vending machine according to claim 1, wherein the update control unit is configured to update of the update target product management data on every input processing.

5. The vending machine according to claim 1, wherein the input and output unit is a touch screen disposed on a front of the vending machine.

* * * * *